July 30, 1968  R. MAYER, JR., ET AL  3,395,277
BOREHOLE FLUID FLOW MEASURING DEVICE USING
RADIOACTIVE TRACER MEANS
Filed May 21, 1964  3 Sheets-Sheet 1

INVENTORS
Marcus C. Young
Robert Mayer, Jr.

BY

ATTORNEYS

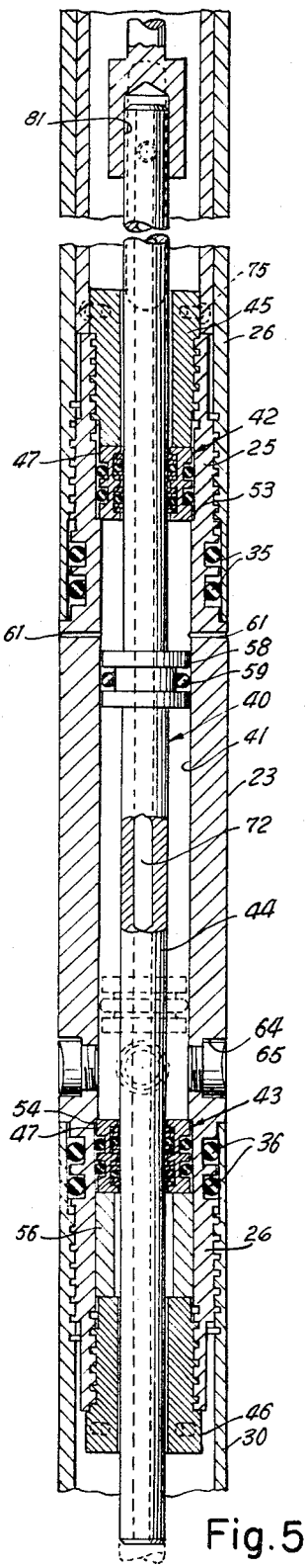
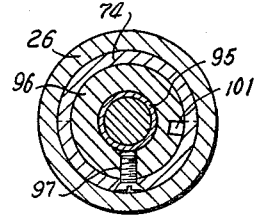
Fig. 6
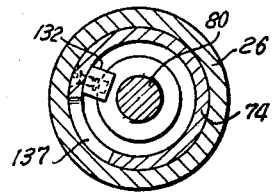
Fig. 7
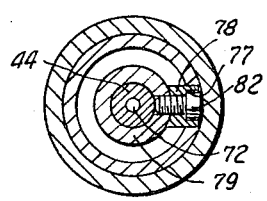
Fig. 8
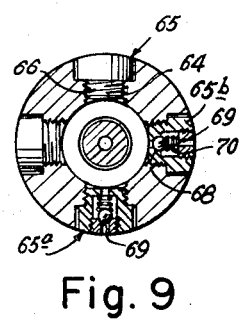
Fig. 9
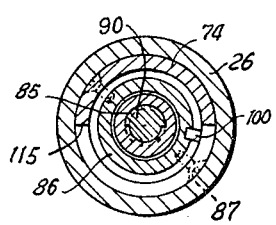
Fig. 10
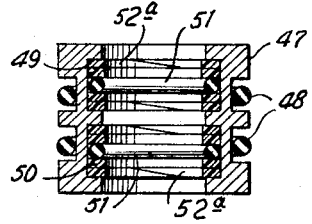
Fig. 11
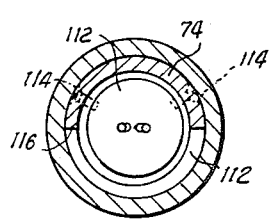
Fig. 12
Fig. 5
INVENTORS
Marcus C. Young
Robert Mayer, Jr.
BY
ATTORNEYS United States Patent Office 3,395,277
Patented July 30, 1968

3,395,277
BOREHOLE FLUID FLOW MEASURING DEVICE
USING RADIOACTIVE TRACER MEANS
Robert Mayer, Jr., Dallas, and Marcus C. Young, Odessa,
Tex., assignors of fifty percent each to Cardinal Surveys
Company, Odessa, Tex., a corporation of Texas, and
Well Reconnaissance, Inc., Dallas, Tex., a corporation
of Texas
Filed May 21, 1964, Ser. No. 369,162
3 Claims. (Cl. 250—43.5)

This invention relates to an apparatus for subsurface exploration of the earth and more particularly to an apparatus for investigating the flow of fluids within a well and into and out of subsurface formations penetrated by the well.

An object of this invention is to provide a new and improved apparatus for investigating the flow of fluids in a well.

Another object is to provide a new and improved apparatus for successively introducing predetermined quantities or charges of radioactive material in a well and determining the direction and velocity of movement of the radioactive charges in the well after they are subjected to fluid movement.

Still another object is to provide an apparatus which has means for injecting a charge of radioactive material at a selected location in a well and means for ascertaining the direction of movement of the charge in the well which does not require movement of the apparatus in the well after such injection to ascertain the direction of movement.

A further object is to provide an apparatus for investigating the flow of fluids in a well which has an injector device for injecting successive charges of predetermined variable quantities of a radioactive material into a well and a pair of detector devices located above and below the injector means for determining the direction of movement of the charges in the well while the apparatus is held stationary in the well.

A still further object is to provide an apparatus of the type described wherein the signal outputs of the two detector devices are transmitted over a common cable to the surface and wherein the apparatus includes means at the surface for recording the signal outputs individually, whereby the upward and downward movement of the charges in the well can be determined without moving the apparatus in the well.

A still further object is to provide an apparatus of the type described wherein the detector devices are energized by batteries lowered therewith into the well and the injector device is energized by electrical current of relatively high voltage transmitted to the injector device through the cable, the detector devices being placed in operation immediately upon the cessation operation of the injector device whereby the detector devices detect the movement of such charges of radioactive material even in locations in the well where a very rapid fluid movement carries the injected charges past the detector devices in a very short period of time after their injection.

Another object is to provide an apparatus for investigating the flow of fluids in a well having an injector device for injecting predetermined successive charges or quantities of radioactive material into a well and having means for connecting one or more detector devices to the injector device in any one of several predetermined relationships to the injector device and to each other.

Additional objects and advantages of the invention will be readily apparent from the reading of the following description of a device constructed in accordance with the invention, and reference to the accompanying drawings, thereof, wherein:

FIGURE 5 is an enlarged vertical sectional view taken on line 5—5 of FIGURE 4;

FIGURE 6 is a sectional view taken on line 6—6 of FIGURE 3;

Figure 4:
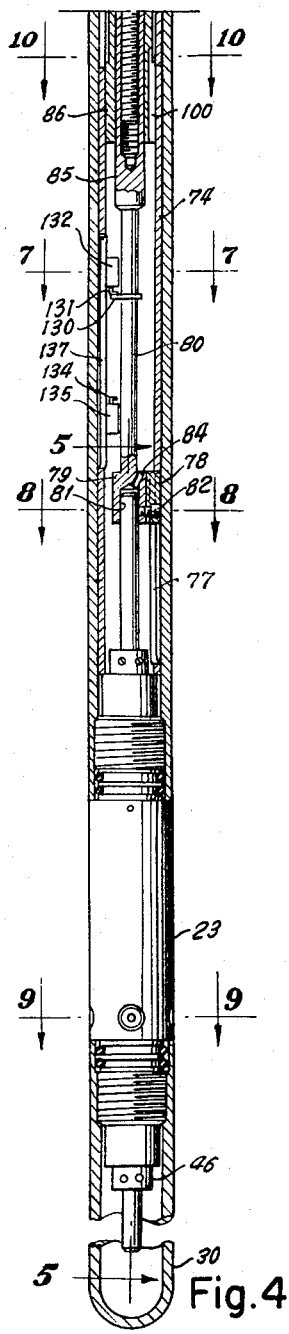
FIGURE 4 is a view similar to FIGURE 3 being a continuation thereof and showing the lower portions of the apparatus.

FIGURES 7, 8, 9 and 10 are sectional views taken on line 7—7, 8—8, 9—9 and 10—10, respectively, of FIGURE 4.

Figure 13:
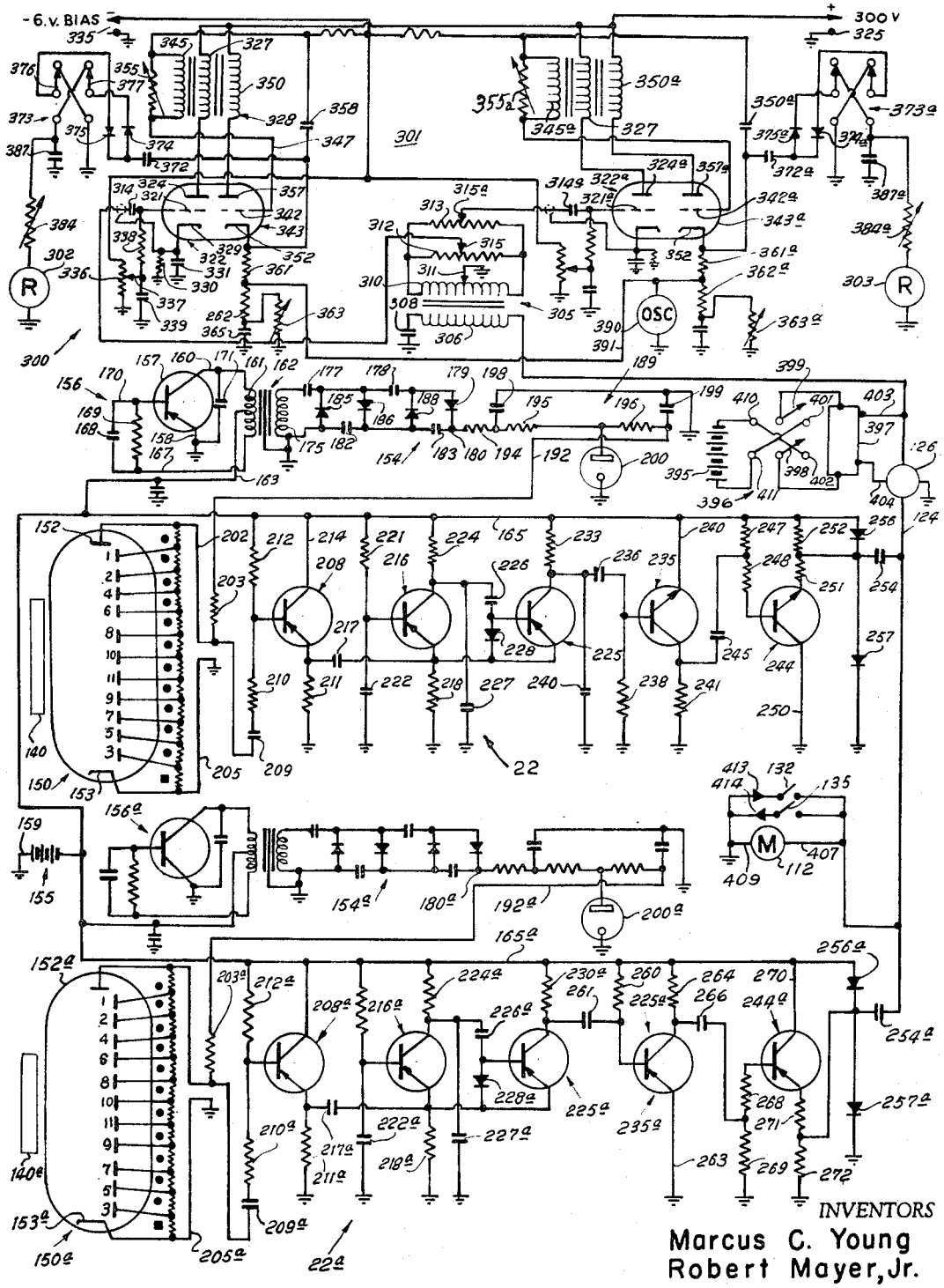

FIGURE 11 is a sectional view taken on line 12—12 of FIGURE 6;

FIGURE 12 is a vertical sectional view of a seal assembly of the injector device illustrated in FIGURE 5; and, FIGURE 13 is a schematic diagram of the electrical circuit of the apparatus.

Referring now to the drawings, the injector and detector apparatus 20 illustrated in FIGURES 1 and 3 through 12, which is movable through a well, includes an injector device 21 and a radiation detector device 22. The injector device includes a pump cylinder 23 having an externally threaded upper end portion 25 which extends into and is connected to a top housing section 26. The top housing section has a lug or ear 28 to facilitate the connection of a flexible line or cable 29 thereto by means of which the apparatus 20 is movable through a well bore. A bottom housing section 30 is threaded on the lower threaded reduced end portion 31 of the pump cylinder 23.

The pump cylinder is provided at each end, inwardly of the threaded reduced portions 25 and 31, with a pair of annular recesses in which are disposed O rings 35 and 36 which seal between the pump cylinder and the top and bottom housing sections, respectively.

A pump piston 40 is mounted in the bore for longitudinal passage 41 of the pump cylinder 23 for limited longitudinal movement relative thereto and through upper and lower seal assemblies 42 and 43 which seal between the piston rod 44 and the pump cylinder 23 and through the tubular upper and lower retainer nuts 45 and 46, respectively. Each seal assembly includes an annular sleeve 47 having a pair of external annular recesses in which are disposed O-rings 48 which seal between the sleeve and the pump cylinder. The sleeve also has a pair of internal annular recesses 49 and 50 in each of which is disposed an O-ring 51 which seals between the piston rod 44 and the sleeve. Helical or split back-up rings 52a are disposed in each internal recess of the sleeve on opposite sides of the O-ring to prevent extrusion of the O-ring when it is subjected to high pressure. Downward movement of the upper seal assembly 42 is limited by the engagement of the bottom or end shoulder of its sleeve 47 with the upwardly facing annular shoulder 53 of the pump cylinder and its upward movement is limited by the upper retainer nut 45 which is threaded into the upper end of the pump cylinder. The lower seal assembly is held against upward movement in the pump cylinder by the engagement of the top annular shoulder or end surface of its sleeve 47 with the downwardly facing annular shoulder 54 of the pump cylinder. Downward movement of the lower seal assembly in the pump cylinder is limited by the retainer nut 46 threaded into the lower end of the pump cylinder and the spacer sleeve 56 interposed between the sleeve of the seal assembly and the retainer nut.

The piston 40 includes an annular piston flange 58 integral with the piston rod 44 and having an O-ring 59 disposed in an external annular recess of the piston flange which seals between the piston flange and the internal surfaces of the pump cylinder.

When in its uppermost position in the pump cylinder, FIGURE 5, the piston flange is located immediately below a plurality of lateral ports 61 of the pump cylinder which permit entry and exhaust of fluids from the passage 41 of the pump cylinder above the piston flange during movement of the piston in the pump cylinder. The pump cylinder also has a plurality of radially spaced lateral ports 64 in each of which is disposed a check valve 65 whose inner reduced portion 66 is threaded in the reduced inner portion of its lateral port. Each of the check valves may include a ball 68 seatable on a seat 69 toward which it is biased by a spring 70. The spring 70 exerts a predetermined force on the ball valve tending to move it into seating engagement with its seat 69 so that a predetermined force must be exerted on the ball valve against the resistance of the spring before the ball valve will move out of seating engagement with its seat 69. One or more of the check valves, such as the check valve 65b, prevents flow of fluids from the pump chamber 41 to the exterior and permits flow of fluids from the exterior of the pump cylinder into its passage or chamber 41 when an inwardly acting pressure differential is exerted across its ball valve whose force is sufficiently great to overcome the resistance of the biasing spring of the check valve. One or more of the other check valves, such as check valve 65b, prevents inward flow of fluids into the pump cylinder chamber 41 and permits flow of fluids from the pump cylinder chamber to the exterior when the pressure differential across its ball valve exceeds a predetermined value, as when the pressure within the pump cylinder passage below the piston flange is increased due to the downward movement of the piston in the pump cylinder.

The piston has a longitudinal passage 72 through which a suitable insulated conductor may extend for a purpose to be described below.

An inner retainer sleeve 74 is telescoped in the upper housing section 26 with its lower end extending downwardly over the upper end of the upper retainer nut 45 to which it is rigidly secured by the screws 75. The inner sleeve has a longitudinal slot 77 in which is slidable a longitudinal rib 78 which extends radially outwardly of the enlarged lower end portion 79 of the connector rod 80. The engagement of the longitudinal side surfaces of the connector rod rib with the longitudinal surfaces of the inner sleeve defining the longitudinal slot 77 prevents rotation of the connector rod. The connector rod has a downwardly opening bore 81 in which extends the upper end portion of the piston rod. The piston rod is rigidly secured to the connector rod by any suitable means, such as the set screw 82. The connector rod has a passage 84 which opens upwardly from the bore 81 through which an insulated conductor may extend.

The upper enlarged portion 85 of the connector rod extends slidably through a bearing sleeve 86 disposed in an intermediate portion of the inner sleeve and is rigidly secured thereto in any suitable manner, as by the screws 87. The connector rod has an upwardly opening longitudinal threaded bore 88 in its upper end portion in which is threaded a drive screw 90. The upper reduced end portion 91 of the drive screw extends into a downwardly opening bore in the lower end portion of a drive coupling 92 and is rigidly secured thereto by the screw 94. The drive coupling extends rotatably through a sleeve bearing 95 press fitted, or otherwise secured, in a bearing ring 96 which is rigidly secured to the inner sleeve in any suitable manner, as by the screws 97. The bearing 86 and the bearing ring 96 are provided with aligned longitudinal slots 100 and 101, respectively, through which an insulated conductor may extend.

The upper end of the drive coupling has an upwardly extending lug 104 which is received in the downwardly opening slot 105 of the drive shaft 110 of a direct current reversible electric motor 112. The motor may be of the permanent magnet type and is secured to the inner sleeve in any suitable manner, as by the screws 114 which extend through the inner sleeve into suitable threaded bores in the housing of the motor.

The inner sleeve has an aperture or window 115 between the bearing 86 and the bearing ring 96 and a similar window 116 between the bearing ring 96 and a conductor support 117 located above the motor. The windows 115 and 116 facilitate installation of the motor, the bearing 86 and the bearing ring 96 in the inner sleeve. The upper end portion of the inner sleeve is semi-circular in cross sectional configuration to facilitate installation of the detector device 22 in the inner sleeve. The detector device is rigidly secured to the inner sleeve by the screws 118 which extend into suitable threaded bores of the housing of the detector device. The tubular conductor support 117 is secured to the inner sleeve by a screw 121. Two or more insulated conductors may extend through the support.

The semi-cylindrical spaces, between the upper top housing section 26 and the various elements mounted in the inner sleeve, provided by the windows 115 and 116 of the inner sleeve and by the semi-cylindrical upper end portion of the inner sleeve are of such dimensions as to permit an insulated conductor to extend therethrough. The top housing section at its upper end has a suitable passage 122 through which an insulated conductor 124 may extend into the upper housing section. A gasket 125 or other suitable sealing means seals between the conductor and the top housing section to prevent flow of fluid through the passage 122. The cable 29 may be looped through the aperture 128 of the lug 28 and held in such looped position by a clamp 127. The cable may include a conductive outer sheath 126 through which the insulated conductor 124 extends so that the top housing section may be electrically connected to the conductive sheath and with the sheath constitute one side of an electric input and output circuit. The insulated conductor 124 of the cable constitutes the other side of such circuit. In this manner, electric current may be transmitted to the motor from the surface and electric output signals from the detector device may be transmitted to the surface by means of the cable by which the apparatus is supported and moved in a well.

The connector rod 80 has an external lug 130 which is engageable with the operator button 131 of a normally open top limit switch 132 mounted in the inner sleeve to close the upper limit switch when the conductor rod and the pump piston are in their uppermost positions. The connector rod lug 130 is also engageable with the operator button 134 of a normally open lower limit switch 135 also mounted in the inner sleeve to close the lower limit switch 135 when the connector rod and the pump piston are in their lowermost positions. The inner sleeve is provided with a longitudinal slot 137 adjacent the location of the limit switches to facilitate the mounting of the switches in the inner sleeve.

It will now be seen that if the pump cylinder chamber or passage 41 below the piston flange 58 is filled with a liquid radioactive material and the pump piston is in its uppermost position relative to the pump cylnder, when the motor 112 is energized to cause its drive shaft 111 to rotate in a counterclockwise direction, FIGURE 6, the rotation of the drive screw in the threaded bore of the connector rod causes the connector rod and the pump piston to be moved downwardly relative to the pump cylinder. As the pump piston moves downwardy, the ball valves of the check valves 65b are moved out of seating engagement with their seats 69 and the radioactive material is injected into the well. The amount of the liquid injected into the well varies in accordance with the period of time that the constant speed motor is energized.

When the direction of rotation of the drive shaft 110 of the motor is reversed by reversing the direction of flow of current in its input circuit, its drive shaft is rotated in the opposite direction, and the piston is moved upwardly. The check valves 65a open during such upward movement of the piston to permit flow of fluid into the pump chamber below the piston to permit such upward movement of the piston. The ports 61 of the pump cylinder permit entry and exhaust of fluids into and from the piston cylinder passage 41 above the piston flange during such downward and upward movement of the pump piston.

If the radioactive material injected into the well now flows upwardly in the well with the liquids present in the well it moves past the detector device which generates output signals transmitted to the surface through the cable 29. It will be apparent that if the apparatus lowered into the well includes only a single detector device and is held stationary, the detector device will detect the movement of the radioactive material in the well only if such movement is upward and will not detect its downward movement in the well.

Figure 1:
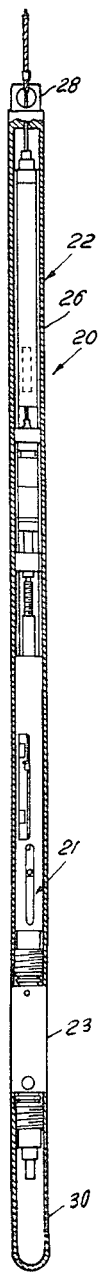
FIGURE 1 is a vertical partly sectional view showing an apparatus embodying the invention comprising an injector device and a single detector device.
Figure 2:
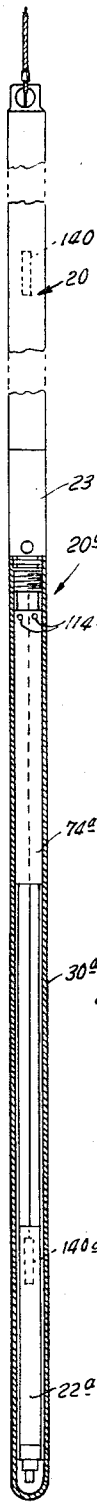
FIGURE 2 is a vertical partly sectional view showing an apparatus embodying the invention having an injector device and detector devices positioned above and below the injector device.
Figure 2A:
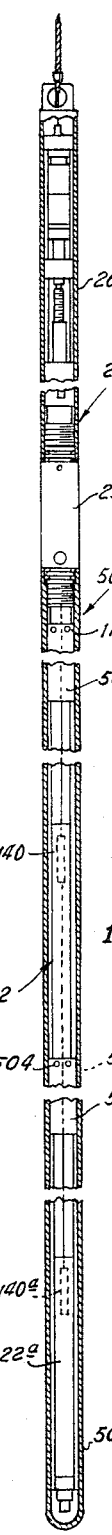
FIGURE 2A is a vertical partly sectional view showing an apparatus embodying the invention having an injector device and two detector devices positioned in spaced relation below the injector device.
Figure 3:
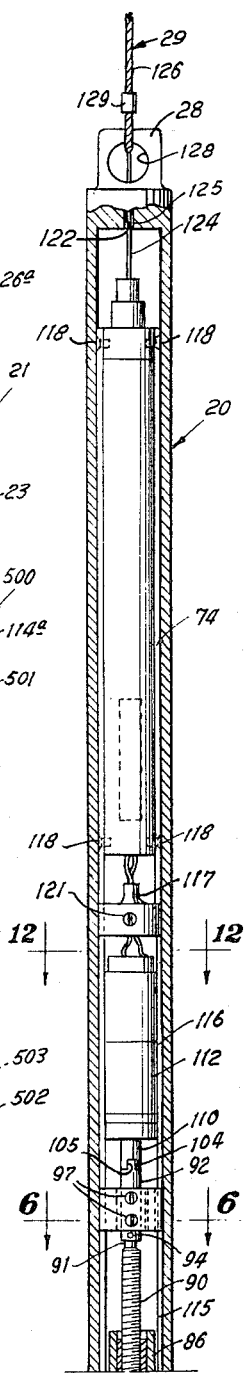
FIGURE 3 is a vertical partly sectional view of an apparatus embodying the invention.

Referring now to FIGURE 2 of the drawings, the apparatus 20a, which differs from the apparatus 20 only in having a second detector device 22a, is usable to detect either upward or downward flow of the radioactive material in the well after its injection thereinto. The second detector device 22a is secured to the lower semi-cylindrical end portion of the inner sleeve 74a whose upper end is telescoped over the lower retainer nut 46 and is rigidly secured thereto by screws 114a. The inner sleeve 74a is of such length that the scintillation crystal 140a of the detector device 22a is spaced from the ports of the pump cylinder the same distance as the scintillation crystal 140 of the upper detector device 22 in order that the velocity of flow of the radioactive material after it has been injected into the well can be easily determined. The apparatus 20a having the two detector devices 22 and 22a spaced above and below the injector device 21 will detect the flow of the radio active material in either upward or downward directions in the well after its injection thereinto without the necessity of moving the apparatus in the well so that any very rapid movement of the radioactive material after it has been injected in the well can be easily detected by the apparatus 20a.

The conductors by means of which direct current is supplied to the lower detector device 22a and its output signals are transmitted to the insulated conductor 124 of the cable 29 extend past the injector device through the various slots and passages provided by the inner sleeve and the various bearings and bearing supports and through the longitudinal passage 72 of the piston 40.

Referring now to FIGURE 13 of the drawing, the two detector devices 22 and 22b may be of substantially the same structure and mode of operation and differ from each other in that one of the detector devices, for example, the upper detector device 22 provides positive output pulses while the detector 22a provides negative output pulses when their scintillation crystals are excited by the radiation emitted by the radioactive material. The detector device 22 includes the usual photomultiplier tube 150 whose conductivity varies in accordance with the degree of excitation of its scintillation crystal 140 by radiation. The anode 152 and cathode 153 of the photomultiplier tube are connected across the output circuit of a voltage multiplier 154 which in turn is supplied with a low voltage direct current by a battery 155. The voltage multiplier and the battery are mounted in a suitable location in the housing of the detector device 22. The voltage multiplier includes an oscillator circuit 156 having a transistor 157 whose emitter is connected to the positive side of the battery through the conductor 158, ground and the conductor 159 and whose collector is connected to the other side of the battery through the conductor 160, the primary winding 161 of an output transformer 162, the conductor 163 which is connected to the electric midpoint or center tap or the primary winding, and the main conductor 165 which is connected to the negative side of the battery. The other side of the primary winding is connected to the base of the oscillator transistor through the conductor 167, the capacitor 168 and the resistance 169 connected in parallel between conductors 167 and 170. A capacitor 171 is connected across the collector emitter circuit of the oscillator transistor.

It will be apparent that the oscillator 156 is of a type well known to those skilled in the art and induces a relatively high frequency alternating voltage in the secondary winding 175 of the output transistor when energized with direct current by the battery 155.

A diode and capacitor network is connected across the secondary winding and includes two capacitors 177 and 178 connected in series with a diode 179 between one side of the secondary winding and the output terminal or point 180 and a pair of capacitors 182 and 183 connected in series between the other side of the secondary winding, which is also connected to ground, and the output terminal 180. A pair of reversely conducting diodes 185 and 186 each have one side connected to the common connection of the capacitors 177 and 178. The other side of the diode 185 is connected to the common connection of the capacitor 182 and one side of the secondary winding while the other side of the diode 186 is connected to the common connection of the capacitors 182 and 183. A diode 188 is connected to the common connection of the capacitor 178 and the diode 179 and its other side is connected to the common connection of the capacitors 182 and 183. The idode 188 and the diode 179 conduct in reverse directions. A filter and voltage regulator network 189 is connected between the output terminal 180 and the output conductor 192 and includes resistances 194, 195 and 196 connected in series between the output terminal 180 and the output conductor 192, a capacitor 198 connected between ground and the common connection of the resistances 194 and 195, a capacitor 199 connected between ground and the common connection of the resistance 196 and the conductor 192, and a voltage regulator diode 200, of the gaseous type, connected between ground and the common connection of the resistances 195 and 196. The anode 152 of the photomultiplier tube is connected to the output conductor 192 through the conductor 202 and the resistance 203 while its cathode 153 is connected to ground by the conductor 205 and thus to the other side of the output of the voltage multiplier and regulator network.

The output of the photomultiplier tube 150 is applied to the base of a first transistor 208, the common connection of the resistance 203 and the anode 152 being connected to the base through a blocking capacitor 209 and the resistance 210 while the emitter is connected to ground through the resistance 211. The base of the first transistor is also connected to the main conductor 165 through the resistance 211. The emitter collector circuit of the first transistor is connected across the battery, its collector being connected to the main conductor 165 by the conductor 214 while its emitter is connected to ground through the resistance 211. The first transistor 208 and its associated resistances provide a high impedance matching circuit for the photomultiplier tube.

The output of the first transistor 208 is applied to the input circuit of the normally conductive second transistor 216, the common connection of the resistance 211 and the emitter of the first transistor being connected by a blocking capacitor 217 to the common connection of the emitter of the second transistor 216 and the resistance 218 which connects the emitter to ground. The base of the second transistor is connected to the common connection of a resistance 221 and the capacitor 222 connected in series between the main conductor 165 and ground. The emitter collector circuit of the second transistor is connected across the battery 155 since its emitter is connected to ground through the resistance 218 and its collector is connected to the main conductor 165 by the resistance 224. The output of the second transistor is applied to the base of a third normally nonconductive transistor 225, the common connection of resistance 224 and the collector of the second transistor being connected to its base through the capacitor 226. A filter capacitor 227 is connected between ground and the common connection of the resistance 224 and the capacitor 221. The base of the third transistor is connected to ground and thus to a source of biasing potential through the diode 228 and the resistance 218. The emitter collector circuit of the third transistor is connected across the battery, its emitter being connected to ground through the resistance 218 and its collector being connected to the main conductor 165 through the resistance 233.

The output of the third transistor is applied to the base of an amplifying transistor 235 through a blocking capacitor 236 connected between the base of the amplifying transistor and the common connection of the resistance 233 and the collector of the third transistor 225. The base of the amplifying transistor is also connected to the ground through a biasing resistor 238. A capacitor 240 is connected between ground and the common connection of the capacitor 236, the resistance 233 and the collector of the third transistor. The amplifying transistor has its emitter collector circuit connected across the battery, its emitter being connected to the main conductor 165 through the conductor 240a and its collector being connected to ground through the resistance 241. The output of the amplifying transistor 235 is applied to the base of the driver transistor 244 by means of a blocking capacitor 245 connected between the common connection of the collector of the amplifying transistor and the resistance 241 and the common connection of the resistances 247 and 248 connected in series between the base of the driver transistor and the main conductor 165. The emitter collector circuit of the driver transistor 244 is connected across the battery, its collector being connected to ground by the conductor 250 and its emitter being connected to the main conductor 165 by the resistances 251 and 252. The output of the driver transistor is applied across the insulated conductor 124 and the sheath 126 of the cable, the common connection of the resistances 251 and 252 being connected to the insulated conductor 124 through a blocking capacitor 254. The common connection of the resistances 251 and 252 and the blocking capacitor 254 is also connected to the common connection of the shunting or protective diodes 256 and 257 which are connected in series across the main conductor and ground to shunt any high voltage pulses of either polarity from the battery 155 and the various elements of the circuit of the detector device 22.

It will now be apparent that each time radiation excites the scintillation crystal 140, the photomultiplier tube is rendered more conductive and a voltage pulse is transmitted by the first transistor 208 to the normally conducting transistor 216 and renders its nonconductive. When the second transistor is nonconductive, it renders the third transistor 225 conductive. The pulse output of the third transistor when it is conductive is then amplified by the amplifying transistor 235 and the driver transistor 244 to cause a positive pulse to be applied across the insulated conductor 124 and the sheath 126 of the cable 28. The magnitude and the frequency of the pulses transmitted to the cable by the detector device 22 will of course vary with the magnitude and frequency of the radiation exciting the scintillation crystal 140.

The circuit of lower detector device 22a of the apparatus 20a is substantially similar to that of the circuit of the upper detector device 22 and, accordingly, its elements have been provided with the same reference numerals, to which the subscript "a" has been added, as the corresponding elements of the circuit of the detector device 22. The circuit of the detector device 22a differs from that of the detector device 22 in that its amplifying and driver transistors 235a and 244a are of the PNP type instead of the NPN type in order that the output of the detector device 22a be in the form of negative instead of positive pulses. The base of the amplifying transistor 235a is connected to the main conductor 165a through a resistance 260 and to the common connection of the resistance 230a and the collector of the third transistor 225a by a blocking capacitor 261. The emitter collector circuit of the amplifying transistor is connected across the battery, its emitter being connected to ground by the conductor 263 and its collector being connected to the main conductor 165a through the resistance 264. The output of the amplifying transistor 290a is applied to the base of the driver transistor 244a by a blocking capacitor 266 which connects the common connection of the resistance 264 and the emitter of the amplifying transistor to the common connection of the resistances 268 and 269 which are connected in series between ground and the base of the driver transistor. The emitter collector circuit of the driver transistor is connected across the battery, its collector being connected to the main conductor 165a by the conductor 270 and its emitter being connected to ground by the resistances 271 and 272. The output of the driver transistor is applied across the insulated conductor 124 and the sheath 126 of the cable through a blocking capacitor 254a, one side of which is connected to the common connection of the resistances 271 and 277 and whose other side is connected to the conductor 124. The detector device 22a is also provided with protective diodes 256a and 257a.

It will now be apparent that when the scintillation crystal 140a of the lower detector device 22a is excited by radiation, the normally conductive second transistor 216a is rendered nonconductive and the normally nonconductive third transistor 225a is rendered conductive. The pulse output of the third transistor is then amplified by the amplifying and driver transistors 235a and 244a which transmit a negative pulse across the conductor 124 and the sheath 126 of the cable 28 each time the scintillation crystal is excited.

The output signals of the two detector devices 22 and 22a thus differ in polarity and the equipment 300 at the surface, to which the output signals of the two signals are transmitted over the common cable 28, has a discriminator circuit 301 which separates the output signals of the detector devices and transmits them to two separate recording instruments 302 and 303. The discriminator circuit comprises an input transformer 305 whose primary winding 306 is connected across the sheath 126 and the conductor 124, one side thereof being connected to the conductor 124 and its other side being connected to ground and therefore to the sheath through a capacitor 308. The secondary winding 310 of the input transformer has its electrical midpoint or center top connected to ground by a conductor 311 and a pair of resistances 312 and 313 are connected in parallel across the secondary winding. The slide contact 315 of the resistance 312 is connected through a blocking capacitor 314 to the grid 321 of an electric discharge device 322 of the vacuum type, whose anode 324 is connected to the positive side of an input circuit 325 of direct current of high voltage through the primary winding 327 of a transformer 328 and whose cathode 329 is connected to the other side of the input circuit 325 through a resistance 330. A filter capacitor 331 is connected across the resistance 330. The conductor from the contact 315 to the capacitor 319 may have a shield 332 thereabout which is connected to ground through the resistance 330 and the capacitor 331. A biasing potential is applied to the grid 321 from an input circuit 335 of direct current of low voltage by means of a resistance 336 connected across the input circuit 335, and the slidable contact 337 which is connected to the grid 320 through the resistance 338, and to ground through the capacitor 339.

The output of the electric discharge device 322 is applied to the grid 342 of a second electric discharge 343, also of the vacuum type and which may be enclosed in the same envelope as the electric discharge device 322, by means of the secondary winding 345 of the transformer 328. One side of the secondary winding is connected to the grid 342 by the conductor 347 and its other side is connected through a blocking capacitor 350 to the cathode 352 of the second electric discharge device 343. A variable resistance 355 is connected across the secondary winding 345 to provide means for adjusting the amplitude of the voltage applied to the grid 342.

The anode 357 of the electric discharge device 343 is connected to the positive side of the input source 325 through a primary winding 358 of the transformer while its cathode is connected to the other side of the input circuit through the series connected resistances 361, 362 and 363 and ground. A filter capacitor 365 is connected across the variable resistance 363. The primary winding 358 is provided to generate a voltage in the secondary winding 345 each time the normally conductive electric discharge 343 is rendered nonconductive to render it conductive again to insure that the output of the electric discharge device 343, each time the normally non-conductive electric discharge device 322 is rendered conductive, is of very sharp pulse form. The output of the electric discharge device is applied across any suitable recording instrument or device 302 by means of a blocking capacitor 372, a double pole, double throw reversing switch 373, a pair of diodes 374 and 375 which are connected reversely in parallel between the capacitor 372 and the movable contacts 376 and 377, respectively, of the switch, the variable resistance 384 and ground. A capacitor 387 is connected across the variable resistance 384 and the recording device 302.

It will be apparent that when the movable switch contacts are in their top positions shown in FIGURE 13, the diode 374 is connected to ground through the movable switch contact 377, the variable resistance 384 and the recording device, and the diode 375 is connected to ground through movable switch contact 376. When the movable contacts are in their lowermost positions, the diode 374 is connected to ground by the movable switch contact 377 while the diode 375 is connected to ground through the movable switch contact 376, the variable resistance 384 and the recording device 302. It will thus be apparent that current flow through the recording device may be reversed by means of the switch.

It will now be apparent that if the contact 315 is now moved to such position on the resistance 312 that each time a positive pulse is applied across the insulated conductor 124 and the sheath 126 of the cable 28, the conductivity of the electric discharge device 322 is increased by a pulse applied to the grid 321 thereof, the electric discharge device 343 will be rendered nonconductive and a pulse will be transmitted to the recording device 302. Since such positive pulse is applied to the insulated conductor 124 and the sheath 126 of the cable only when the scintillation crystal 140 of the detector device 22 is excited by the radiation, the recorder 302 will only record the radiation detected by the detector device 22.

The circuit between the contact 315a of the resistance 313 and the recording device or recorder 303 is identical to that of the circuit described in connection with the recording device or recorder 302 and, accordingly, its elements have been provided with the same reference characters, to which the subscript "a" has been added, as the corresponding elements of the circuit between the contact 315 and the recording device 302. The movable contact 315a of course is moved to such position on the resistance 313 that each time a negative pulse is applied across the insulated conductor 124 and the sheath 126 of the cable 28, a sharp pulse is transmitted to the recorder 303 and the recorder 303 will record only the negative pulses applied across the cable.

It will now be seen that the discriminator circuit 301 separates the output signals of the two detector devices 22 and 22a and transmits them to the recorder devices 302 and 303, respectively. The recording devices may be of any suitable type. For example, they may have pens which draw suitable tracings on a disc or paper strip which is moved past the pens. The reversing switches 373 and 373a are employed to change the direction of movement of the pens.

If desired, the discriminator circuit may also include an oscilloscope 390 to give a visible indication of the outputs of the two detector devices. One side of the oscilloscope is connected through a conductor 391 to the common connection of the resistances 361 and 362 which are connected in series between ground and the cathode 352 of the electric discharge device 343 and also to the common connection of the resistances 361a and 362a which are connected in series between ground and the cathode 352a of the electric discharge device 343a. The other side of the oscilloscope is connected to ground.

It will be apparent that since the oscilloscope is now connected across the resistances 362 and 363 and also across the resistances 362a and 363a, it will show simultaneously the signal outputs of the two detector devices 22 and 22a. If desired, any suitable device for giving audible signals may also be provided and connected in the discriminator circuit in the same manner as the oscilloscope.

The motor 112 of the injector device 21 is connectable across a direct current source 395 of high voltage located at the surface by means of a reversing switch 396, any suitable manually resettable type circuit breaker 397 and the cable 29.

When the movable switch contacts 398 and 399 of the reversing switch 396 are moved to the positions wherein they engage the stationary contacts 401 and 402 of the switch, the positive side of the battery is connected through the circuit breaker 397 and the conductor 403 to the insulated conductor 124 of the cable 28 and the negative side of the battery is connected through the circuit breaker and the conductor 404 to the sheath 126 of the cable thus causing the current to flow in one direction through the motor, one side of which is connected to the conductor 124 through the conductor 407 and whose other side is connected through the conductor 408 and ground to the sheath 126. When the movable switch contacts 399 and 398 are moved to positions wherein they engage the stationary switch contacts 410 and 411, the negative side of the battery is connected to the conductor 124 through the circuit breaker and the conductor 403 and its positive side is connected to the sheath. In this manner, the electric current may be caused to flow in either direction through the motor and its direction of rotation be reversed.

The limit switch 132 is connected in series with a diode 413 across the motor 112 while the limit switch 135 is connected in series with a diode 414 across the motor. It will be apparent that when the motor 112 is energized and the pump piston is moved to its uppermost position the upper limit switch 132 is closed and short circuits the motor 112 causing an overload on the circuit breaker 397 which then opens and de-energizes the motor. The motor cannot again be energized until the switch 396 is moved to its opposite position to reverse the flow of current to the motor and the circuit breaker is reset. When the switch is moved to its opposite position, the motor is not short circuited since even though the upper limit switch is now closed, the diode 413 prevents current flow in this opposite direction and the lower limit switch 135 is open. As soon as the motor 112 is again energized to move the pump downwardly, the upper limit switch 132 opens and the motor continues to run if the switch 396 is held closed until the lower limit switch 135 is closed. When this occurs, the motor is again short circuited through the lower limit switch 135 and the diode 414 which conducts current in the opposite direction from that in which the diode 413 conducts. The circuit breaker again opens and the motor cannot again be energized until the switch is moved to its other opposite position to cause current to flow in the reverse direction through the motor and the circuit breaker is again reset.

In use, the apparatus 20a is made up at the surface with the battery 55 connected to the input circuits of the two detector devices 22 and 22a. The pump chamber or passage 41 of the pump cylinder below the piston flange 58 is filled with a radioactive substance, for example, one which emits gamma rays and has a relatively short half-life. A slight upward force is exerted on the piston by means of the motor 112 to cause a slight vacuum or inwardly acting pressure differential to exist in the passage 41 below the piston flange to prevent any accidental escape of the radioactive material during its movement into and through the well. The spring 70 of any check valve 65a, through which the radioactive material may be introduced into the pump cylinder passage by a suitable fill fixture as the motor moves the pump piston upwardly, holds its ball valve in sealing engagement with its seats 69 against the force exerted by such pressure differential. The drive screw connection between the motor drive shaft and the connector rod hold the piston in any position to which it is moved by the motor.

The apparatus 20a is then lowered into the well by means of the cable 28, with the two detector devices 22 and 22a in operation. If desired, a suitable coupling collar locator may also be positioned in a suitable location in the housing of the apparatus to help position the apparatus at the desired location in the well.

When the apparatus has been lowered to a desired location in the well and it is desired to determine the direction and velocity of movement of the liquids in the well at such location, for example the direction of water pumped into the well to promote producing of well fluids by another well, the adjustable resistances 384 and 384a are set to cause any background radiation present in the well to be ineffective to operate the recorder devices 302 and 303. The switch 397 at the surface is then closed for a predetermined period of time to energize the motor 112 and cause it to move the piston downwardly to inject a predetermined quantity of the radioactive material into the well. When the switch 396 is closed, the much higher voltage from the source 395 of direct current blocks any transmission of output signals from the two detector devices to the discriminator circuit 301 of the surface equipment 300. Any sharp pulse of high voltage applied across the insulated conductor 124 and the sheath 126 of the cable when the switch 396 is opened or closed, is not applied to the battery or the detector devices due to the shunting of such pulses by the protective diodes 256, 256a, 257 and 257a. When the switch is closed at the surface and held closed for a predetermined period of time, the predetermined quantity of the radioactive material is injected into the well from the passage 41 through the check valves 65b since the motor is of a constant speed type.

When the desired predetermined quantity of radioactive material has been injected into the well, the switch 396 is moved to its intermediate open position and as soon as it is moved to its open position, the high voltage is removed from across the insulated conductor 124 and the sheath 126 of the cable 28 and the signal outputs of the two detectors are immediately transmitted to the discriminator circuit which in turn transmits them to the recorder devices 302 and 303. While the motor 112 is of course always connected across the output circuits of the two detector devices, it has a relatively high inductive impedance and this does not interfere with the transmittal of the output signals of the detector devices to the surface equipment. As the injected radioactive material moves with the liquids flowing in the well at the location of the apparatus, and past one of the detector devices, the radiation emanating from the injected radioactive material excites its scintillation crystal and the signal output of such detector is transmitted to the surface and to its respective recorder device 302 or 303. For example, if the liquid movement in the well is upwardly, the injected radioactive material will be moved upwardly from the discharge ports of the injector device 21 and past the scintillation crystal 140 of the upper detector device 22. The output signals of the detector 22 caused by the excitation of its scintillation crystal by the radiation emanating from the injected radioactive material, are transmitted in the manner described above to the recorder device 302 through the cable 28 and the discriminator circuit 301. If the fluid movement in the well is downwardly, the injected radioactive material will be moved downwardly past the scintillation crystal 140a of the lower detector device 22a whose output signals caused by the excitation of its scintillation crystal by the radiation emanating from the injected radioactive material will be transmitted to the surface through the cable 28 and the discriminator circuit 301 to the recording device 303. The interval of time between the injection of the radioactive substance material into the well and the indication of its movement past either the upper or the lower detector device is of course an indication of the velocity of flow of liquids in the well at the location of the apparatus 20a since the distances between the discharge ports 64 of the injector device and the scintillation crystals of the two detector devices are known and are preferably equal.

If no output signals are received from either the detector devices 22 or 22a after the injection of the radioactive material into the well, it will be apparent that there is either no upward or downward flow of liquids in the well at the location of the apparatus or that the injected radioactive material is flowing outwardly from the well into an earth formation located between the two detector devices.

Since the detector device is held stationary and the detector devices are operative immediately upon the de-energization of the pump motor 112, even extremely rapid fluid flow in the well at the location of the apparatus will be detected since there is no time gap or interval between the injection of the radioactive material into the well and the initiation of operation of the two detector devices.

If desired, after the initial injection has been made and the detector devices have indicated the direction of flow of fluids in the well, the motor may be energized to rotate in its opposite direction to create a slight pressure differential in the passage 41 of the pump cylinder below the piston flange before the apparatus is moved to a different location in the well for a subsequent operation thereof. This prevents any leakage of the radioactive material from the injector device during the movement of the apparatus to such other locations. Successive injections of predetermined different quantities of radioactive material may be made by use of the injector device while it is held stationary at the same location in the well or at different desired locations in the well until the pump piston has been moved to its lowermost position in the pump cylinder. When this occurs, the upper limit switch 132 closes and short circuits the motor whereupon the circuit breaker 397 opens and gives a visual indication or signal as by the movement of the usual button or handle of the circuit breaker, that no more radiation material can be injected into the well. When all the radioactive material has been injected into the well, the pump motor is preferably operated several times to successively draw liquid into the chamber 41 below the pump piston and then pump out or inject such well liquids out into the well to rinse or flush out any radioactive material remaining in the chamber or passage 41 before the apparatus is brought back to the surface. The circuit breaker of course opens each time the pump piston is moved to either of its extreme positions due to the closing of the upper or lower limit switches.

It will be seen that the cable 29 by means of which the high voltage direct current is transmitted to the motor of the apparatus and by means of which the output signals of the two detector devices are transmitted to the surface includes only one insulated conductor enclosed by a conductive sheath 126 and does not contain two or more insulated conductors, which is of great advantage since the cable is exposed to high pressures and high temperatures in the well and if the cable had two or more insulated conductors the high pressures and temperatures would very often cause accidental contact or shorting between the two conductors. It will now be seen that the apparatus 22a may include a pair of spaced detector devices which detect the radiation from radioactive material ejected by the apparatus, that the output signals of the two detector devices are in the form of short pulses of opposite polarities, and that the output signals of both detector devices are transmitted to the surface over a single common cable and are separated at the surface for transmittal to separate recording devices.

It will further be seen that the detector devices are at all times energized by the battery 155 and will transmit their output signals to the surface immediately upon the cessation of energization of the pump motor whereby the apparatus is capable of detecting very rapid flow of liquids which could escape detection if it were necessary to first open the switch which controls operation of the pump motor and then close another switch to cause energization of the detector devices.

If the apparatus 20 which includes only a single detector device 22 is used in the well, the whole discriminator circuit 301 of course is not needed and the output of such single detector device 22 may be transmitted to a recording device through a simple amplifier. If the discriminator circuit 301 is available it may be employed to transmit the output signals of such single detector to the recording device 302.

It will be apparent that the two detector devices 22 and 22a may both be connected above or below the injector device 21. For example, the apparatus 500 has the injector device 21 at its upper end and the two detector devices 22 and 22a disposed therebelow. In this case the top housing section 26a is relatively short and covers the upper end of the upper portions of the injector device, its lower end being threaded on the upper end portion of the pump cylinder 23. An inner sleeve 501 is connected to the lower retainer nut 46 by means of screws 114a, the detector 22 being rigidly secured to such inner sleeve. A second inner sleeve 502 to which the lower detector device 22a is connected telescopes over a dependent nut or lug 503 of the housing of the upper detector device 22 and is secured thereto by screws 504. The inner sleeves 501 and 502 are preferably of such lengths that the distance from the discharge ports 64 of the injector device 21 to the scintillation crystal 140 of the upper detector device 22 is equal to the distance between the scintillation crystal 140 and the scintillation 140a of the lower detector device 22a so that the velocity of flow of the liquids between the two detector devices and between the detector devices and the injector device may be easily computed as the interval of time in which the radioactive material moves from the injector device past the first upper scintillation crystal and then the lower scintillation crystal is of course easily determined at the surface by means of the recorder devices. The bottom housing section 506 is threaded on the lower end of the pump cylinder of the injection device.

In the event that some portions of the injected radioactive material due to the peculiarities of the liquid flow in the well, at some period of time flow, are moving simultaneously past both detector devices 22 and 22a, both detector devices of course generate output signals or pulses of opposite polarities which, if they were of equal amplitudes and were perfectly synchronized would cancel out each other. Since the radiation from the radioactive material is random, such synchronization does not occur in practice, and both detector devices will transmit signals to their associated recording devices and such peculiarity of flow will be detected and recorded.

While the material injected by the injector device has been described as radioactive and the described detector devices detect the radiation emanating therefrom, it will be apparent that the tracer or signal producing material may be of any desired type which produces a signal or has some detectable characteristic in which event the detector devices would be of appropriate type capable of detecting such signal or such characteristic.

If the fluids in the well are electrically conductive, one side of the circuit to and from the apparatus could be through the fluids and the earth, and the metal casing of the well if the well is cased. In this event the cable 29 could have only the insulated conductor 124 as the other side of the circuit to and from the apparatus.

The foregoing description of the invention is explanatory only, and changes in the details of the construction illustrated may be made by those skilled in the art, within the scope of the appended claims, without departing from the spirit of the invention.

What is claimed and desired to be secured by Letters Patent is:

1. An apparatus for investigating the flow of fluids within a well and movable in a well by a flexible member having a pair of electric conductors insulated from one another, said apparatus comprising: an injector having a chamber for holding a charge of tracer material and electrically energizable means for injecting predetermined variable quantities of said tracer material into a well from said chamber, said electrically energizable means including a reversible electric motor; a pair of detector devices for detecting tracer material injected into a well and moved past said detector devices by fluids moving in the well; means for connecting said injector and detector devices in any one of several longitudinally aligned relationships relative to one another, said detector devices providing output signals of opposite polarities for transmittal to the surface by said conductors, said motor of said injector device being operable by electric current transmitted from the surface through said conductors; a source of electric current in said apparatus for energizing said detector devices; and surface equipment including a pair of recording devices, and a discriminator circuit connected between said conductors and said recorder devices for transmitting the output signals of said two detector devices separately to said recording devices, and means for reversing the direction of flow of electric current from the surface to said motor through said conductors.

2. An apparatus for investigating the flow of fluids within a well and movable within a well by a flexible member having a pair of electric conductors insulated from one another, said apparatus comprising: an injector device having a chamber for holding a charge of tracer material and electrically energizable means for injecting predetermined variable quantities of tracer material into a well from said chamber and for drawing fluid from the exterior of said injector device into said chamber, said electrically energizable means including a reversible electric motor; a pair of upper and lower detector devices spaced above and below said injector device for detecting said tracer material injected into a well when the tracer material is moved past said detector devices by fluids flowing in a well, said detector devices providing output signals of opposite polarities for transmittal to the surface by said conductors; means in said apparatus for energizing said detector devices; and surface equipment including a pair of recording devices, and a discriminator circuit connected between said conductors and said recorder devices for transmitting the output signals of said two detector devices separately to said recording devices, and means for reversing the direction of flow of electric current from the surface to said motor through said conductors, said injector means injecting tracer material from said chamber into the well when said motor is energized by electric current flowing in one direction through said conductors and drawing fluid from the well into said chamber when said motor is energized by current flowing in the opposite direction through said conductors.

3. The apparatus of claim 2, wherein said injector device has a plurality of ports for permitting flow of fluids between said chamber and the exterior of said injector devices, one of said ports having a check valve means preventing flow of fluid from said chamber to the exterior of the injector device and another of said ports having valve means preventing flow of fluids from the exterior of the injector device into said chamber.

References Cited

UNITED STATES PATENTS

| | | | |
|---|---|---|---|
| 2,453,456 | 11/1948 | Piety | 250—43.5 |
| 2,617,941 | 11/1952 | Craggs | 250—43.5 |
| 3,116,419 | 12/1963 | Martin | 250—53.5 X |
| 3,123,708 | 3/1964 | Limanek | 250—43.5 |
| 3,255,347 | 6/1966 | Cobb et al. | 250—43.5 |

ARCHIE R. BORCHELT, *Primary Examiner.*